United States Patent [19]

Gloppestad

[11] 4,216,239

[45] Aug. 5, 1980

[54] PROCESS FOR RECOVERING MEAL AND FAT FROM ANIMAL RAW MATERIALS

[75] Inventor: Einar Gloppestad, Tumba, Sweden

[73] Assignee: Alfa-Laval AB, Tumba, Sweden

[21] Appl. No.: 888,316

[22] Filed: Mar. 20, 1978

[30] Foreign Application Priority Data

Mar. 22, 1977 [SE] Sweden ............................... 7703258

[51] Int. Cl.$^2$ .......................... A23L 1/31; A23L 1/325
[52] U.S. Cl. ...................................... 426/456; 210/71; 210/73 R; 210/74; 210/78; 426/472; 426/480; 426/519
[58] Field of Search ............... 426/641, 643, 456, 465, 426/472, 478, 479, 480, 509, 519, 510, 511; 99/516, 537; 210/66, 69, 71, 72, 73 R, 73 W, 74, 78

[56] References Cited

U.S. PATENT DOCUMENTS

| | | | |
|---|---|---|---|
| 2,193,871 | 3/1940 | Hanno | 426/472 X |
| 2,497,367 | 2/1950 | Notevarp | 426/472 X |
| 2,832,684 | 4/1958 | Sirnes | 426/472 X |
| 2,877,122 | 3/1959 | Hiller | 426/465 |
| 3,020,160 | 2/1962 | Downing et al. | 426/480 X |
| 3,063,840 | 11/1962 | Sullivan | 426/480 |
| 3,078,165 | 2/1963 | Alberts | 426/480 |
| 3,780,191 | 12/1973 | Langer et al. | 426/480 X |
| 3,804,964 | 4/1974 | Hogstedt et al. | 426/479 X |
| 3,959,518 | 5/1976 | Vincent | 426/643 |
| 4,137,335 | 1/1979 | Holm et al. | 426/472 X |

OTHER PUBLICATIONS

Van Aisdel et al., *Food Dehydration,* vol. 2, 1973, p. 284.

*Primary Examiner*—Arthur L. Corbin
*Attorney, Agent, or Firm*—Cyrus S. Hapgood

[57] ABSTRACT

Immediately after the animal raw material is boiled, the main part of its fat content is removed by centrifugal separation. The residue, consisting essentially of sludge and stick-water, is then subjected to a mixing operation, and sludge is removed from the mixture by a second centrifugal separation.

1 Claim, 1 Drawing Figure

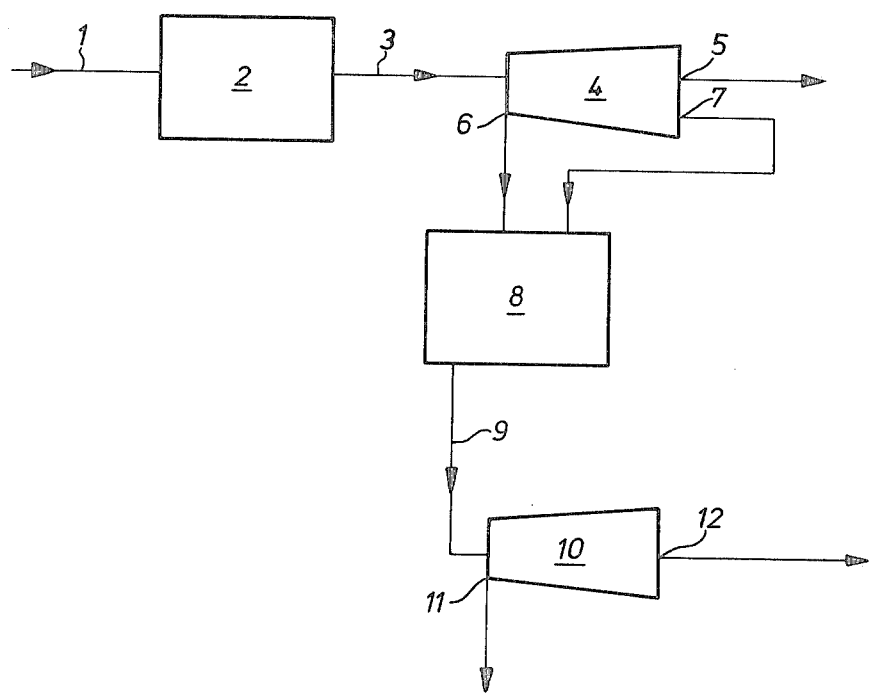

PROCESS FOR RECOVERING MEAL AND FAT FROM ANIMAL RAW MATERIALS

The invention is related to a process for the production of meal with low fat content and fat of high quality from animal raw materials. Since at present it seems to be of particular interest to apply the invention for processing fish raw material, the invention in the following will be described in connection with this application field. The art people, however, readily realize that the invention can be generally employed for processing any animal raw material, such as slaughter-house waste.

The basic principle in the production of ordinary fish meal consists in boiling the fish raw material, preferably by indirect heating, and separating the boiled material into solid components and fat containing stick-water. The solid components are removed and dried, and the fat is removed from the stick-water, which is usually then evaporated to a concentrate which might be dried together with the solid components.

The usual ways to separate and remove solid material from the boiled product is pressing or centrifugal separation. More and more severe demands for hygienic methods in the food industry indicate increasing use of centrifugal separators by means of which generally also a higher fat separation can be achieved as compared to presses.

In a normal fish meal-fish oil process the goals are, at reasonable process costs, to produce a meal having the lowest possible fat content, the lower fat content implying higher protein content and higher tenability, and to achieve maximum oil yield and high oil quality. An important criterium of high oil quality at this process stage is that the oil lends itself to be easily refined. Modern investigations have displayed that the occurence of sulphur in the oil makes the fat hardening step of the refining process essentially more difficult and expensive. The main reason for this state of things is that small amounts of sulphur act as a catalyst poison for the hydrogenation catalyst. The investigations have shown that the sulphur content of the oil increases after the boiling of the fish raw material and during each process step wherein the oil at elevated temperature is in contact with the solid material and the stick-water, the latter containing sulphur compounds having been leached out. It is therefore of great importance to reduce as much as possible the processing period of time during which the oil is subjected to elevated process temperature.

From the process economy point of view it is further essential to avoid the addition of external water, which would increase the boiler load and/or the evaporator load. In the ordinary fish meal-fish oil process comprising the use of centrifugal separation of the boiled material, the choice has been not to add external water implying that a limited fat washing-out from the solid material and a limited oil yield must be accepted.

A certain increased fat washing-out can be achieved by recirculating stick-water after fat separation to a point before the separation of the boiled material. Such a recirculation is disclosed in the Swedish patent specification 325 468, but according to the same specification only part of the stick-water can be recirculated directly to the separator, whereas a certain part must be recirculated to the boiler, thereby further loading the same. Recirculation of stick-water only to the separator would lead to increased accumulation of fine material that is hard to separate off and would jeopardize the separation. There is further a general tendency in the food industry to avoid, where possible, all kinds of recirculation steps due to the risk of accumulation of micro-organisms and detrimental substances in the process flows.

The object of the present invention is to provide a centrifugal separator based process for recovering meal and fat from an animal raw material, thereby, in comparison with common processes, reducing the fat content of the meal, increasing the fat yield and improving the fat quality and at the same time avoiding the problems and the disadvantages being associated with recirculation of stick-water.

These goals have been reached by a process characterized in removing from the boiled material the main part of the fat contained therein directly after the boiling step by means of a first centrifugal separator, then subjecting the residue, being constituted by essentially solid material and stick-water, to a mixing operation, and removing solid material from the mixture so obtained by means of a second centrifugal separator.

According to the invention, the boiled fish material is fed to a centrifugal separator, from which the main part of the fat is discharged as a separate oil phase through a separate outlet from the separator for further refining. The separator is suitably a so called decanter centrifuge, that is a centrifugal separator having a rotating transport screw. The sludge and the stick-water are discharged from the separator either through two additional separate outlets or through one common additional outlet. In the first case such a decanter is required which besides the sludge outlet is provided with two different liquid outlets for heavier and lighter liquid, respectively.

The sludge and the stick-water, regardless of being separately or jointly discharged, are subject to a mixing operation and fed into a second centrifugal separator, suitably being a decanter. As shown in the accompanying drawing, the mixing operation can be carried out in a special mixing tank or it can be achieved in any manner during the transport of sludge and stick-water to the second separator.

In the second separator separation into a sludge phase and a stick-water phase is carried out and the sludge is discharged through the sludge outlet of the separator and sent to a drying unit, whereas the stick-water is discharged through the liquid outlet of the centrifuge for further oil separation and evaporation.

The invention does not include the stick-water treatment after the separation in the second separator.

The accompanying drawing shows schematically an example of an embodiment of the process according to the invention.

Fish raw material is fed through a line 1 to a boiler 2. The boiled material is fed through a line 3 into a decanter 4. An oil phase is discharged through a line 5, the oil phase containing the main part of the fat in the boiled material. From two additional separate outlets 6 and 7 of the decanter 4 sludge and stick-water respectively are discharged and sent to a mixing tank 8. From the tank 8 a mixture of stick-water and solid material is fed through a line 9 into a decanter 10. From the decanter 10, separating sludge from stick-water, stick-water and sludge are discharged at 12 and 11 respectively and sent to a drying unit.

The following example will further illustrate the process according to the invention. Example A is given for purpose of comparison and is related to a conventional centrifugal separation based process, whereas example B is related to the process of the invention.

EXAMPLE A 1000 kg fish raw material having the composition stated below was boiled and fed into a decanter, being equipped with a sludge outlet and a liquid outlet for a stick-water-fat phase.

| Raw material composition | kg | % |
|---|---|---|
| DS (fat free) | 190 | 19 |
| Water | 710 | 71 |
| Fat | 100 | 10 |

DS = dry solids

The streams leaving the decanter had the following compositions:

|  | Sludge phase | | Liquid phase | |
|---|---|---|---|---|
|  | kg | % | kg | % |
| DS | 143 | 34 | 47 | 8.1 |
| Water | 264.4 | 63 | 445.6 | 76.8 |
| Fat | 12.6 | 3.0 | 87.4 | 15.1 |

The sludge was dried to fish meal having a water content of about 10% and having a fat content of 7.3%.

EXAMPLE B 1000 kg of the same fish raw material as used in example A was boiled and fed into a decanter being provided with separate outlets for an oil phase, a stick-water phase and a sludge phase. Amounts and compositions of the streams leaving the decanter was as follows:

|  | Sludge phase | | Oil phase | Stick-water phase | |
|---|---|---|---|---|---|
|  | kg | % | kg | kg | % |
| DS | 146.4 | 35 |  | 43.7 | 8.8 |
| Water | 259.1 | 62 | 0.8 | 450 | 90.5 |
| Fat | 12.5 | 3 | 84.2 | 3.3 | 0.7 |
| Total | 418 |  | 85 | 497 |  |

The sludge phase and the stick-water phase were sent to a collection tank provided with a temperature control device, where mixing was carried out for 10 minutes at a temperature of 95° C. Then the mixture was fed into a decanter, from which a sludge phase and a stick-water phase were discharged. Amounts and compositions of the streams leaving the decanter were as follows:

|  | Feed | Sludge | | Stick-water phase | |
|---|---|---|---|---|---|
|  | kg | kg | % | kg | % |
| DS | 190.2 | 134.8 | 35 | 55.2 | 10.4 |
| Water | 709.1 | 242.5 | 63 | 466.7 | 88.1 |
| Fat | 15.8 | 7.7 | 2 | 8.1 | 1.5 |
|  | 915 | 385 |  | 530 |  |

The sludge was dried to fish meal having a water content of 10% and having a fat content of 4.9%.

A comparison between example A and example B shows that the fat content of the fish meal was reduced by more than 2%.

I claim:

1. In the recovery of meal and fat from an animal raw material, the process comprising the steps of boiling said raw material, subjecting said material, directly after the boiling step, to a first centrifugal separation in a centrifugal separator having a rotating conveyor screw and three separate outlets including a first outlet through which a liquid fat phase is discharged, a second outlet through which stick-water is discharged, and a third outlet through which a sludge phase is discharged, subjecting said sludge phase and stick-water to a mixing operation in a mixer to form an intimate mixture of said sludge phase and stick-water, and then removing sludge from said mixture by subjecting said mixture to a second centrifugal separation.

* * * * *